United States Patent [19]

Thurber et al.

[11] 4,128,875

[45] Dec. 5, 1978

[54] OPTIONAL VIRTUAL MEMORY SYSTEM

[75] Inventors: Kenneth J. Thurber, Edina, Minn.; Jon C. Strauss, Wayne, Pa.

[73] Assignee: Sperry Rand Corporation, New York, N.Y.

[21] Appl. No.: 751,789

[22] Filed: Dec. 16, 1976

[51] Int. Cl.² .............................................. G06F 3/00
[52] U.S. Cl. .................................................. 364/200
[58] Field of Search ... 364/200 MS File, 900 MS File

[56] References Cited

U.S. PATENT DOCUMENTS

| 3,693,165 | 9/1972 | Reiley et al. | 364/200 |
| 3,764,996 | 10/1973 | Ross | 364/200 |
| 3,781,808 | 12/1973 | Ahearn et al. | 364/200 |
| 3,800,291 | 3/1974 | Cocke et al. | 364/200 |
| 3,829,840 | 8/1974 | Burk et al. | 364/200 |
| 3,942,155 | 3/1976 | Lawlor | 364/200 |
| 4,060,849 | 11/1977 | Bienvenu et al. | 364/200 |

Primary Examiner—Gareth D. Shaw
Assistant Examiner—Michael C. Sachs
Attorney, Agent, or Firm—William D. Bauer; Kenneth T. Grace; Marshall M. Truex

[57] ABSTRACT

The present invention relates to a memory addressing mechanism which has been formulated to accommodate three address structures: real, based and virtual. To accomplish this result the address generation function in the memory addressing mechanism has been separated into two distinct parts, address computation and address translation. By merely changing the hardware components in the address translation part of the memory addressing mechanism and leaving the hardware in the address computation part constant, an optional memory addressing mechanism which supports either a real address structure, a based address structure or a virtual address structure can be implemented.

Further, the present invention with the virtual address translation apparatus in cooperation with the fixed address computation apparatus provides a virtual addressing mechanism which will compute and retrieve a memory word utilizing a four-segment memory address with only two memory references.

14 Claims, 8 Drawing Figures

COMPUTED ADDRESS

Fig. 1

PRIOR ART

ADDRESS TRANSLATION REAL OPTION

ADDRESS TRANSLATION VIRTUAL PRIOR ART

PRIOR ART
Fig. 8

OPTIONAL VIRTUAL MEMORY SYSTEM

BACKGROUND OF THE INVENTION

Real, based and virtual addressing structures have been used in various prior art apparatus. In a real address environment the memory address is sent directly to the memory, with or without address mode modification, and utilized by the memory as an absolute memory address. In a based memory addressing environment a portion of the memory address is utilized to select a base register, the contents of which are then added or concatenated to the remainder of the memory address, again with or without mode modification. An example of a based addressing mechanism is disclosed in U.S. Pat. No. 3,731,283, Lewis R. Carlson, et al, Digital Computer Incorporating Relative Addressing of Instructions. Virtual memory addressing environments, often providing a memory address field larger than the capacity of the resident memory, provide for the actual memory address computation by a translation into a lookup table with a portion of the original address which will provide a pointer to be used as an absolute reference into resident memory from which an index is taken with another portion of the original address, again with or without address mode modification. This virtual translation means may be accomplished through one or more steps. The address utilized by the apparatus in the present invention is a four segment address utilizing three translation steps called page, segment and process with the fourth part of the address being utilized as the index once the absolute memory pointer address is determined. Examples of virtual memory systems in the prior art are illustrated by U.S. Pat. No. 3,614,746, Jacob Fredrik Klinkhamer, Memory Addressing Device Using Arbitrary Directed Graph Structure, and U.S. Pat. No. 3,761,881, David W. Anderson, et al, Address Translation Storage Scheme For Virtual Memory System.

While each of these three memory addressing structures are well known in the prior art and have been well documented, they are relatively inflexible in changing from one of the addressing structures to another. Each of the address structures requires a substantial commitment in hardware to support the address generation mechanism and in the software, the different schemes generally not being software compatible. The solution to the problem of changing from either a real or based address structure to a virtual address structure typically has been to "add-on" the virtual address generation mechanism to the final address previously generated by the old addressing mechanism. This solution results in excessive waste of hardware and a serious deterioration in system operating speed.

Further, in prior art virtual address structures a four segment computer address as is utilized in the present invention, containing process, segment, page and offset identifiers, and hence containing three levels of virtual translation, typically require four memory references. One memory reference is required to obtain the process pointer so that a second memory reference can obtain the segment pointer and still a third memory reference can obtain the page pointer, at which point the absolute memory address of the data word to be retrieved is known. A fourth memory reference then is required to actually obtain the data word.

SUMMARY OF THE INVENTION

The present invention provides an optional memory addressing system which can easily accommodate either a real, based or virtual address structure. The present inention also provides an optional memory addressing system in which the software is upward compatible from the real to the based to the virtual address structure. Further, the present invention provides an improved virtual addressing system in which a four segment address is translated with only two memory references.

The present invention provides, in a digital computer of the type having a memory for storing words at addressable locations therein, an address generation apparatus for generating either real, based or virtual address structures from a software specified address consisting of at least three fields adapted to specify mode identifier, register identifier and offset identifier which is divided into two separate parts. The first part is an address computation means for computing an address consisting of at least four fields adapted to specify segment, page and displacement identifiers from a software specified address consisting at least three fields adapted to specify mode, register and offset identifiers. The second part consists of an address translation means coupled to the address computation means for translating the address consisting of at least four fields adapted to specify process, segment, page and displacement identifiers into a single memory address utilized by the memory.

BRIEF DESCRIPTION OF THE DRAWINGS

The foregoing advantages, construction and operation of the present invention will become more readily apparent from the following description and accompanying drawings in which.

DESCRIPTION OF THE PREFERRED EMBODIMENT

The addressing mechanism of the present invention, in order to provide superior performance and greater versatility, has been divided into two separate parts. The first part performs address computation and the second part does the address translation. While maintaining constant address computation hardware and modifying only the address translation hardware, addressing mechanisms can be constructed which perform a real address structure, a base address structure or a virtual address structure. Moreover, the addressing mechanism of the present invention is constructed such that software is upward compatible from the real address structure, the base address structure, to the virtual address structure. That is, software written to operate on the real address structure will operate just as well on the base address structure or the virtual address structure; and software developed to operate on the base address structure will operate just as well on the virtual address structure.

Figure 1:
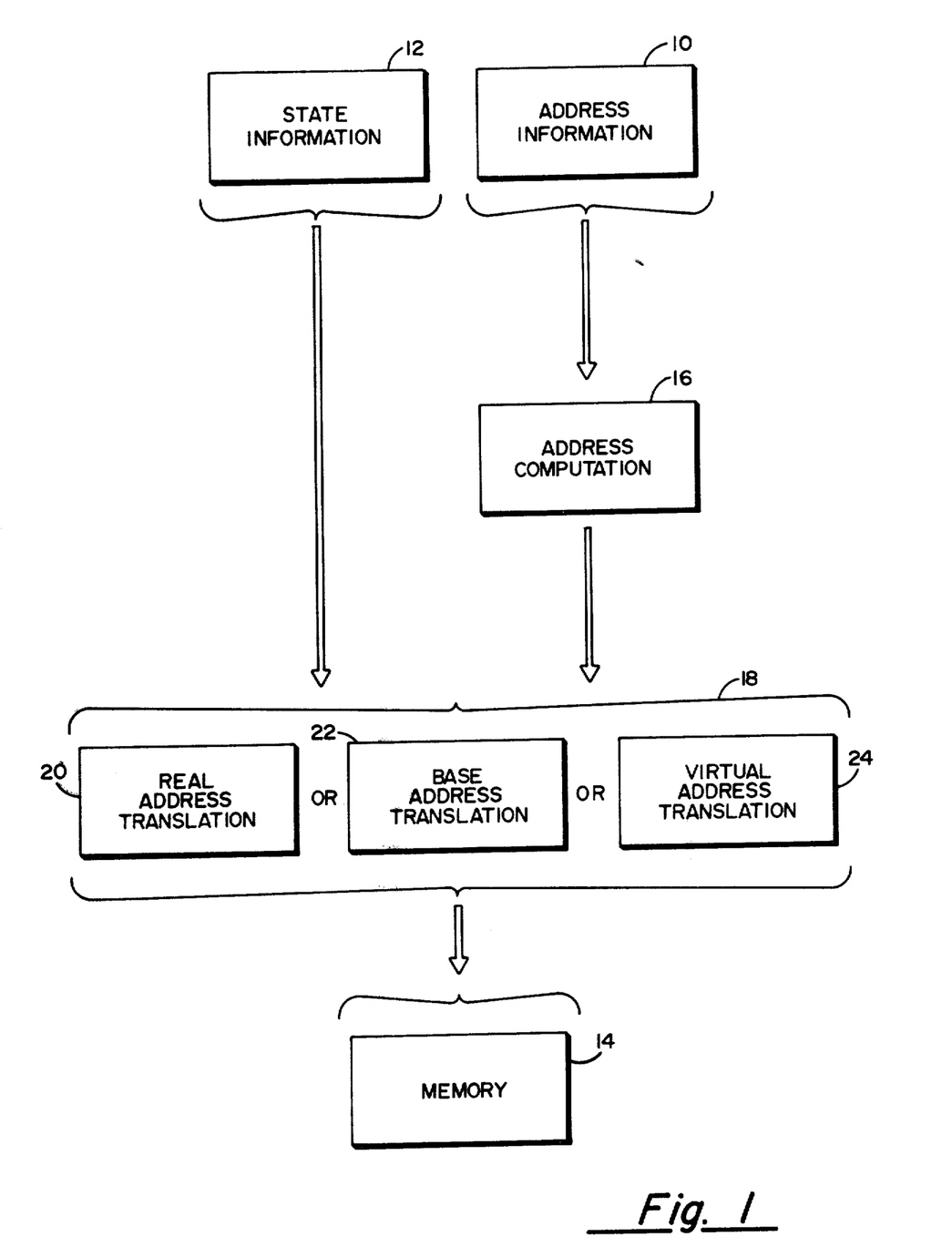
FIG. 1 is a block diagram schematic representation of a general addressing mechanism.

FIG. 1 shows by means of a block diagram the general organization of the addressing mechanism of the present invention. Here address information 10, which is software supplied, and some predetermined state information 12, which is a function of the particular state in which the computer is operating at a given time, combine to provide the entire addressing information necessary to reference the memory 14. The address information 10 is supplied directly to the first part of the address generation mechanism, i.e., the address computation mechanism 16. The information from the address computation mechanism 16 is then fed along with the predetermined state information 12 to the second part of the address generation mechanism, namely, the address translation mechanism 18. The result of the address translation 18 is then fed directly to the memory 14 as an absolute memory address. As can be seen in the figure, the address translation mechanism 18 may consist of three separate and distinct options. Either a real address translation means 20, a base address translation means 22 or a virtual address translation means 24 can be implemented in the address translation mechanism 18. This general block diagram illustrates the versatility in providing a real address structure, a base address structure or a virtual address structure with the modification of a minimal amount of hardware in the total addressing mechanism.

Figure 2:
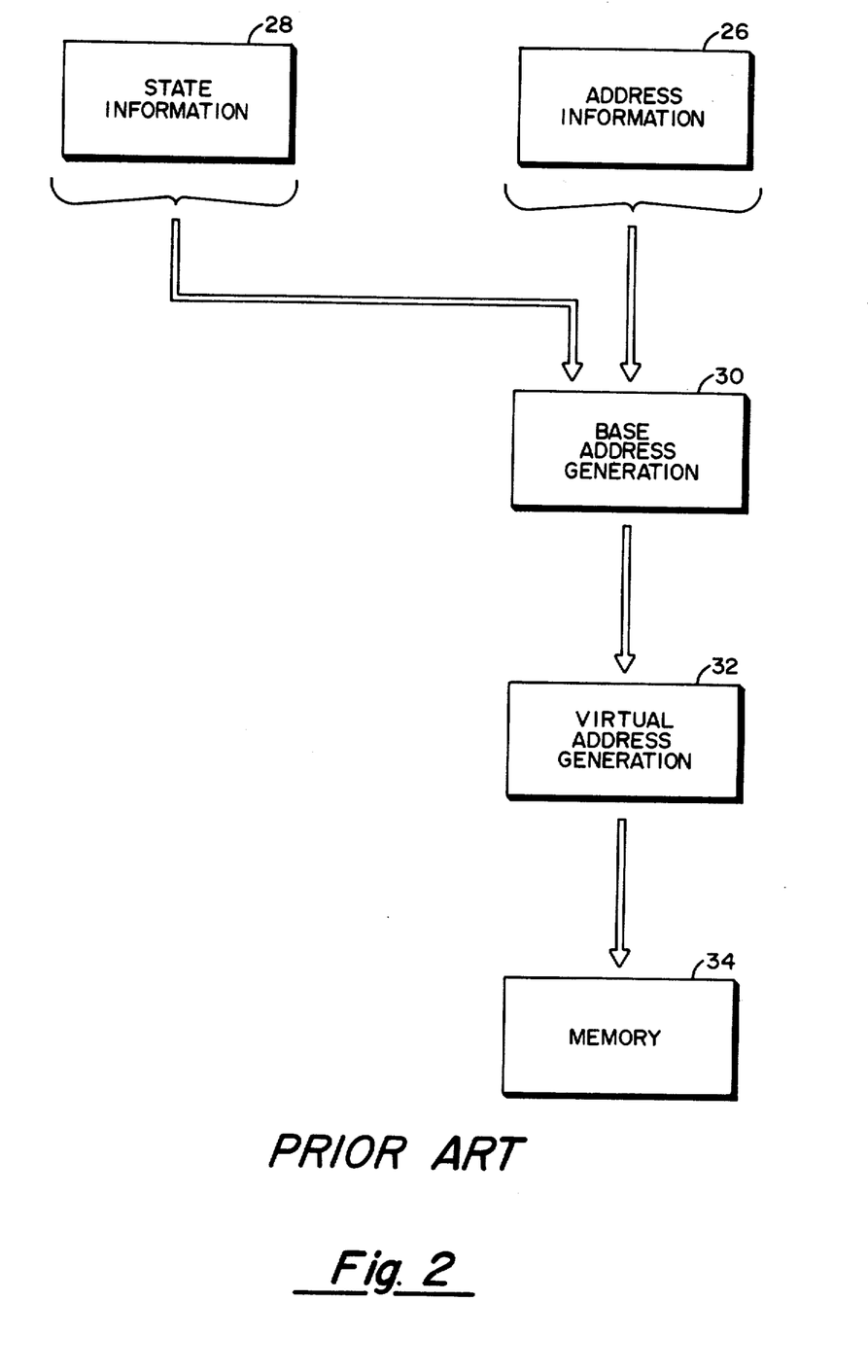
FIG. 2 is a block diagram schematic representation of a prior art conversion from a base addressing mechanism to a virtual addressing mechanism.

The foregoing method of obtaining a virtual address structure from an addressing mechanism which previously supported only a real or based address structure differs from many prior art methods of obtaining virtual address translations, as is illustrated in FIG. 2. In many of these prior art addressing mechanisms, a virtual address generator has been added as a final step of the address generation process. Here, the software supplied address information 26 and the predetermined state information 28 is supplied directly to a base address generation mechanism 30. Then after the address has been generated in a base address structure, the information is supplied to the virtual address generation mechanism 32. Then, only after another address is generated in this virtual address structure is the information supplied directly to the memory 34. This means for providing virtual address generation is wasteful in terms of hardware, since both base address generation means 30 and virtual address generation means 32 must be supplied, and in terms of system operating speed since a full base address generation must take place before the virtual address generation means can commence.

Figure 3:
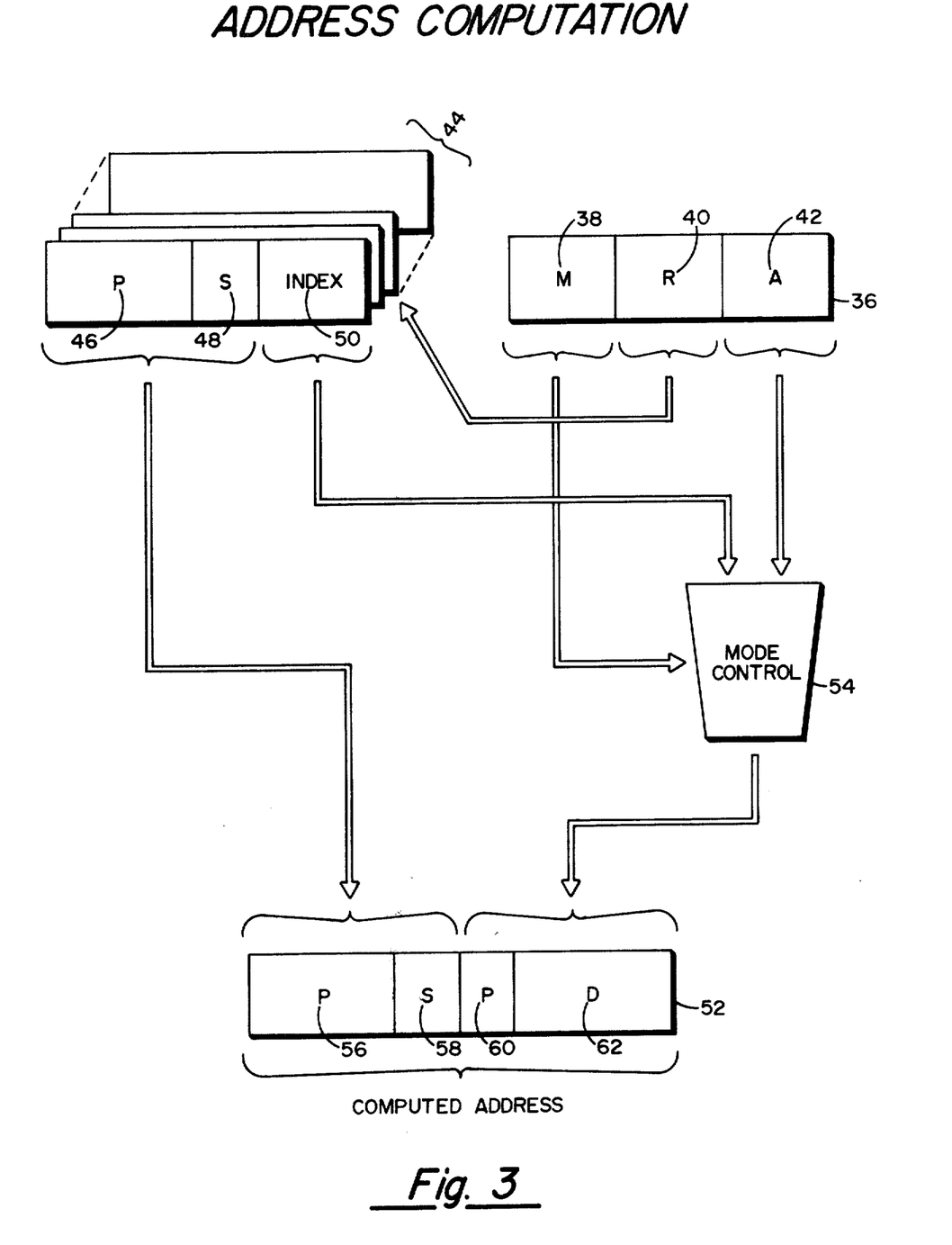
FIG. 3 is a schematic representation of the address computation means.

As illustrated in FIG. 1, the total address generation mechanism of the present invention has been separated into two distinct parts, the address computation part 16 and the address translation part 18. FIG. 3 provides a schematic representation of the hardware necessary to implement the address computation part 16 of the address generation mechanism shown in FIG. 1. Here the software supplied address information is contained in a hardware register 36. This address information register 36 is shown as being comprised of three distinct parts to provide for three separate identifiers, namely, a mode identifier 38, a register identifier 40 and an offset identifier 42. The register identifier 40 of the address information register 36 is used to select one of a set of process registers 44. These process registers 44 contain the predetermined state information represented by block 12 in FIG. 1. In this particular embodiment, the register identifier 40 of the software of a plurality of process registers 44.

The state information contained in each of the process registers 44, and more particularly in the selected one of the process registers 44, is separated into three distinct identifiers, a process identifier 46, a segment identifier 48 and an index identifier 50. Both the process identifier 46 and the segment identifier 48 are supplied directly to the computed address register 52 without modification.

The mode identifier 38 of address information register 36 is supplied to a mode control means 54. The mode control means 54 is merely a means for further modifying the address information contained in the address information register 36. The mode control means 54 also receives as input the offset identifier 42 of the address information register 36 and the index identifier 50 of a selected one of the process registers 44. Examples of functions which the mode control means 54 can perform would be an indexing of the offset identifier 42 by the index identifier 50 or by an increment or decrement of the offset identifier 42 without utilizing the index identifier 50. The output of the mode control means 54 is supplied to a remaining portion of the computed address register 52.

A simple example of circuitry to perform the function of the mode control means 54 would be a standard binary adder having two inputs and a single output. One of the inputs of the binary adder could be connected directly to the offset identifier 42 of the address information register 36. The other input of the binary adder could be connected to the single output of a four input selector. The inputs of the selector could be connected to the index identifier 50 of a selected one of the process registers 44 and the other three inputs could be connected to a hard-wired plus one, zero and minus one, respectively. The control inputs of the selector could be connected directly to the mode identifier of the address information register 36. The single output of the binary adder simply comprises the output of the mode control means 54. Connected in this manner the control means may either pass the offset identifier 42 unchanged (by selecting the hard-wired zero input of the selector), add the offset identifier 42 to the index identifier 50 (by selecting the index identifier input of the selector), or incrementing or decrementing the offset identifier 42 (by selecting the hard-wired plus one or minus one input of the selector, respectively).

It is to be noted that the mode control means 54 is merely a tool by which the software can further manipulate the address information supplied to the address information register 36. The mode control means 54 is by no means essential to the operation of the address computation part of the address generation mechanism. Alternatively, the offset identifier 42 of the address information register 36 could be supplied directly to the computed address register 52 without passage through the mode control means 54 and without utilizing the mode identifier 38 and the index identifier 50. The mode control means 54 is an element of a digital computer well known in the art. For an example of this device reference may be had to an article entitled "Advanced Real-Time Processing System (ARPS)", authored by Kenneth J. Thurber, Peter C. Patton, Robert C. DeWard, Jon C. Strauss and Thomas W. Petschauer, appearing at pages 51A through 51I in the EASCON 1976 Record, IEEE publication 76 CH1154-4 EASCON, the PDP-11 Processor Handbook published by Digital Equipment Corporation in 1973 at pages 3-1 through 3-18 or the PDP-11/70 Processor Handbook, published by Digital Equipment Corporation in 1975, at pages 3-1 through 3-16.

A portion of the information contained in the computed address register 52 has also been obtained from the process identifier 46 and segment identifier 48 of a selected one of the process registers 44 and the offset identifier 42, with or without mode modification, obtained either directly from the address information register 36 or from the address information register 36 in conjunction with the mode control means 54 as determined by the mode identifier 38 and the index identifier 50. The part of the information contained in the computed address register 52 obtained from the offset identifier 42 is divided into two parts. Specifically, this information is separated into a page identifier 60 and a displacement identifier 62. Thus, the information contained in the computed address register 52 comprises a four segment address consisting of process identifier 56, segment identifier 58a, page identifier 60 and displacement identifier 62 which together represent the complete computed address of the address computation part of the total address generation mechanism.

Figure 4:
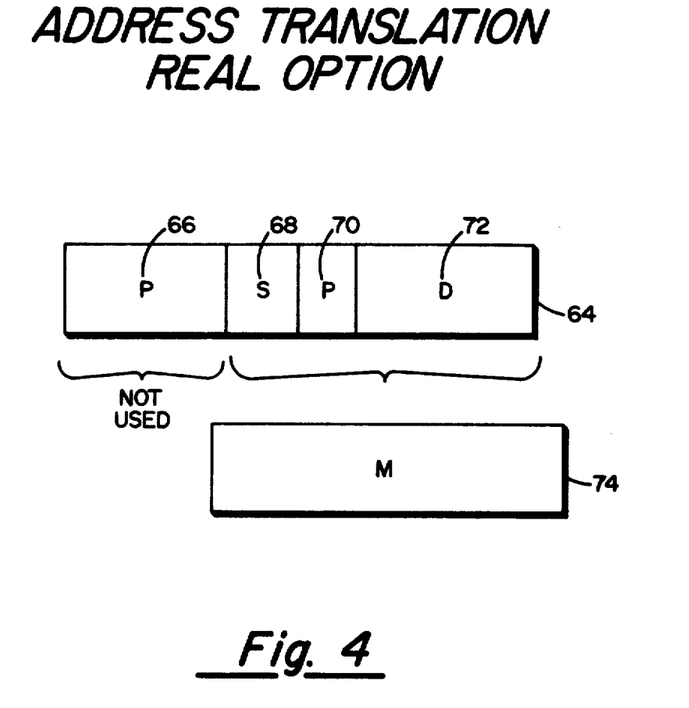
FIG. 4 is a schematic representation of the real address translation means.
Figure 5:
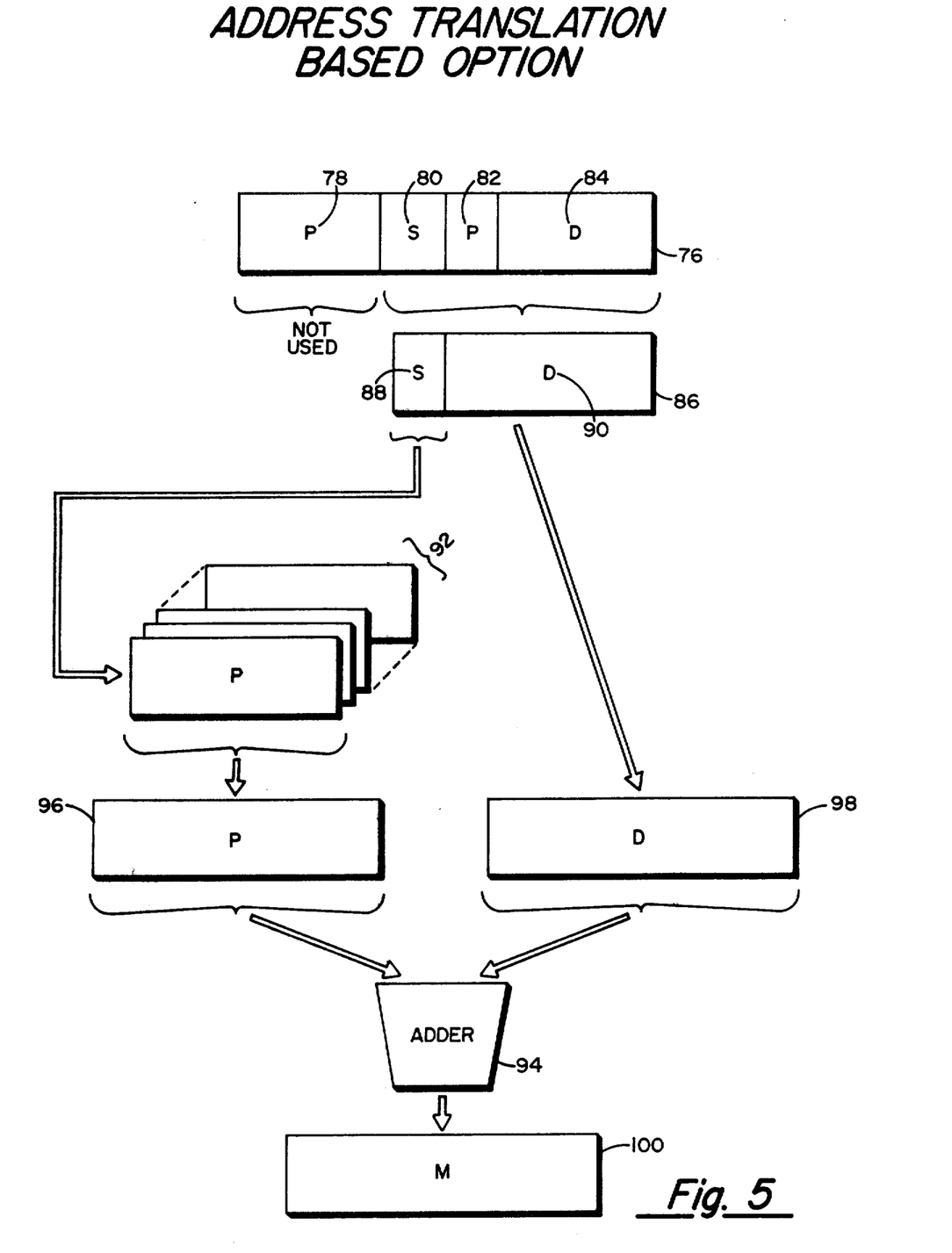
FIG. 5 is a schematic representation of the base address translation means.
Figure 6:
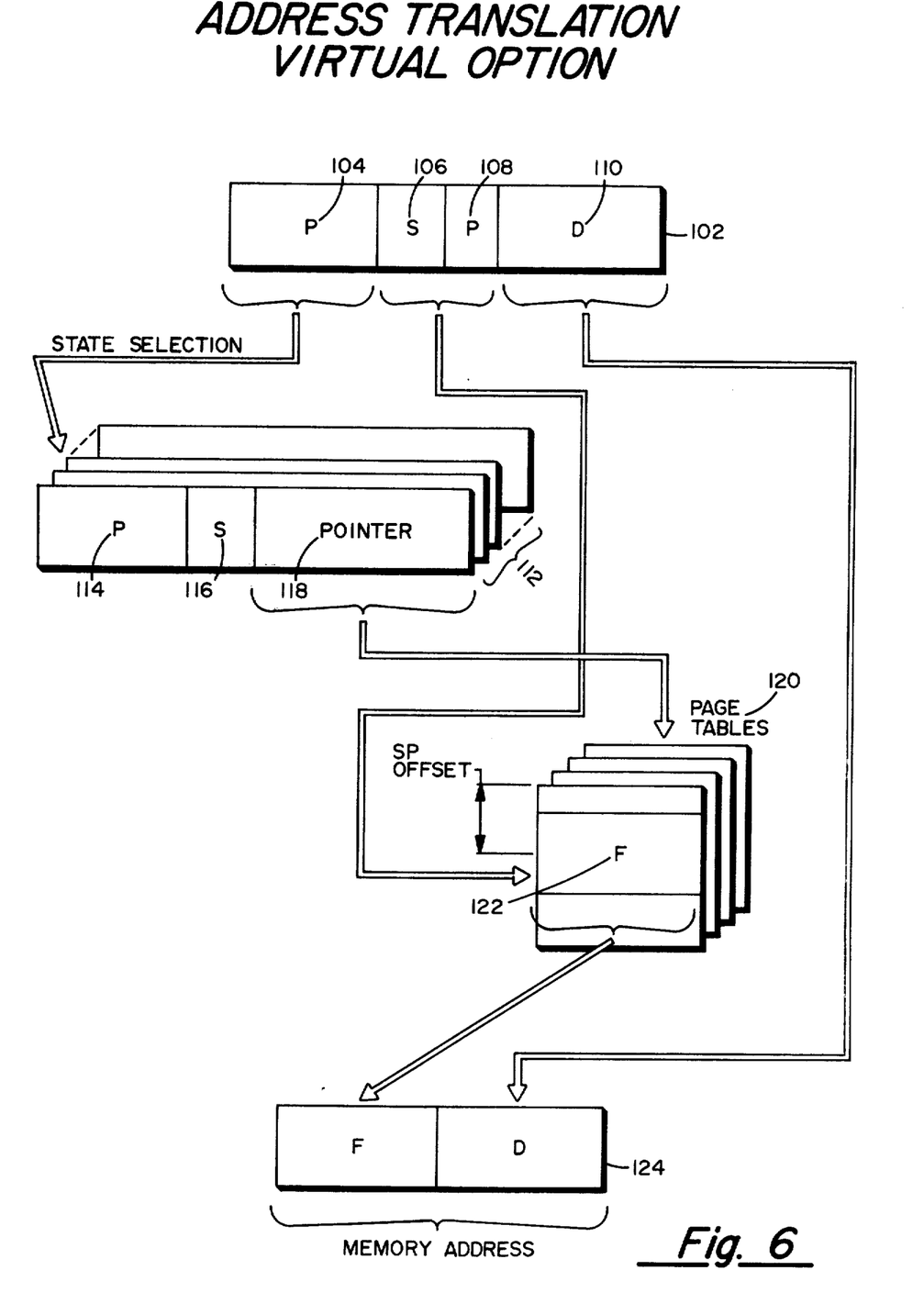
FIG. 6 is a schematic representation of the virtual address translation means.

The schematic representation of FIG. 3 describes the operation of the address computation of the total address generation mechanism. However, it will be recalled from the description of FIG. 1 that there can be three separate and distinct address translation parts which will cooperate with the computed address generated by the address computation part of the address generating mechanism, i.e., a real address translation mechanism, a base address translation mechanism and a virtual address translation mechanism. FIGS. 4, 5 and 6 will describe the operation of the address translation part of the address generation mechanism with the three options, real, based and virtual, respectively.

In the real address translation option, described with reference to FIG. 4, the computed address of the address computation mechanism is shown as resident in register 64. Register 64 in this instance is the same as and contains the same information as register 52 in FIG. 3, representing the computed address of the address computation mechanism. As previously described when the operation of the address computation mechanism was explained, the information contained in register 64 consists of a four segment address consisting of a process identifier 66, a segment identifier 68, a page identifier 70, a displacement identifier 72. In the real address option, this information is used directly as an absolute memory address with no further address translation taking place. In this manner the software supplied address information along with the predetermined state information of the computer are supplied directly, with or without mode modification, to the memory address register 74. Depending upon the particular application, and particularly in those virtual address applications, only a portion of the information contained in register 64 may be desired to be utilized in the memory address register 74. That is, there may be more bits of address information in register 64 than can be used to address resident memory. Therefore, as is illustrated in FIG. 4, a portion of the information contained in register 64 is not used while the remainder of the information is supplied directly, without further translation, to the memory address register 74, where it is utilized as an absolute address into resident memory.

The diagram of FIG. 5 represents the hardware which may be used to implement the base address translation option. Here, register 76 contains the computed address of the address computation mechanism and can be the same register as register 52 of FIG. 3. Again, this computed address information contains a process identifier 78, a segment identifier 80, a page identifier 82 and a displacement identifier 84. Again, since this option is not a virtual address structure, a portion of the information contained in register 76 may not be utilized depending upon the particular application. This is illustrated in FIG. 5 by the brackets which show that a part of the information contained in register 76 is not used. The remainder of the information contained in register 76 is then not utilized as segment, page and displacement identifiers. Instead, represented by block 86 (which is not a separate hardware register but merely a schematic representation of the restructuring of the information contained in register 76) the remaining information is utilized as a two-field address consisting of segment identifier 88 and displacement identifier 90. The information contained in the segment identifier 88 of block 86 is used to select one of a plurality of page registers 92. The contents of a selected one of the page registers 92 is sent to one of the inputs of an adder 94. The displacement identifier 90 of block 86 is sent to the other input of adder 94. The result of the addition of the page value from a selected one of the page registers 92 to the displacement value 90 from the computed address register 76 is then sent to the memory address register 100 where it is utilized as an absolute memory address.

The simplest of several versions of the virtual address translation option is illustrated in FIG. 6. Here the computed address from the address computation mechanism 16 in FIG. 1 is contained in register 102. Register 102 may be the same register as was illustrated in FIG. 3 as register 52. Register 102 contains the computed address consisting of a page identifier 104, a segment identifier 106, a page identifier 108 and a displacement identifier 110. The virtual address translation hardware interprets this information as a virtual address. The process identifier 104 of register 102 is used to associatively select one of a plurality of state registers 112. The information contained in each one of the plurality of state registers 112 consists of a process identifier 114, which is directly analogous to the process identifier 104 held in register 102, a segment identifier 116, which is directly analogous to the segment identifier 106 contained in register 102, and a pointer identifier 118. The hardware makes an associative search of the plurality of state registers 112 utilizing the process identifier 104 of register 102 to obtain a match with the process identifier 114 of one of the plurality of state registers 112. Once this selection has been made, the pointer identifier 118 of the selected one of the plurality of state registers 112 is utilized to selectively address one of a plurality of page tables 120. Each one of the plurality of page tables 120, which can be a register set or may be represented as memory addresses in resident memory, contain a plurality of separate locations. An index into the selected one of the page tables 120 is made by way of the segment identifier 106 and page identifier 108 concatenated to form an index which selects one of the plurality of locations within the selected one of the page tables 120. This selected location contains a frame identifier 122. The frame identifier is then concatenated with the displacement identifier 110 contained in register 102 and both are inserted into the memory address register 124 and forms the absolute address which is then utilized to address resident memory.

Figure 7:
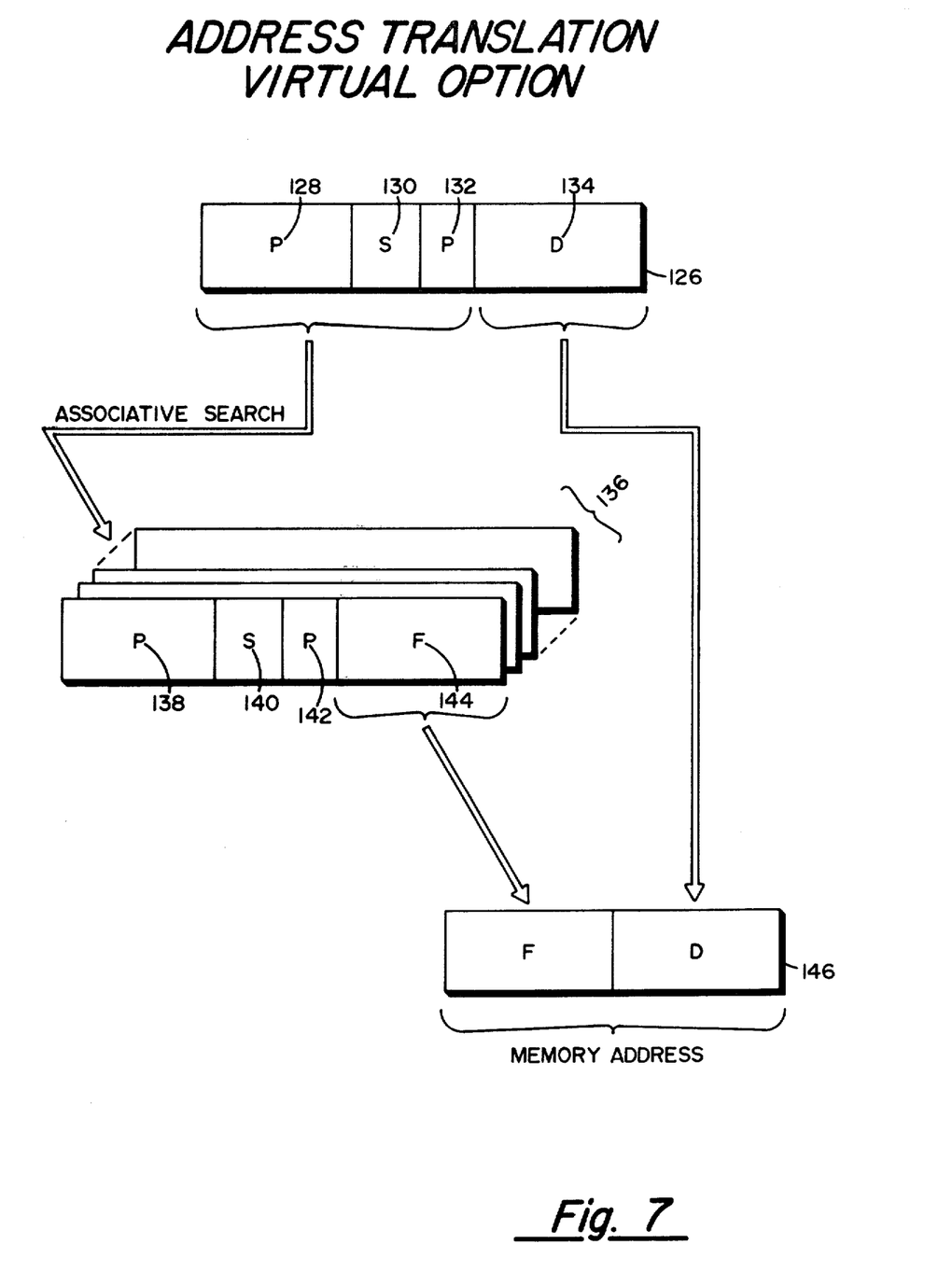
FIG. 7 is a schematic representation of the virtual address translation mechanism with a look-aside buffer match.

The virtual address translation mechanism may be substantially simplified by providing an associative look-aside buffer which may be utilized to obtain the frame identifier instead of utilizing the pointer obtained from the associative search of the state registers using the process identifier. This virtual address translation option is schematically illustrated in FIG. 7. Here the computed address is held in register 126. Again, this register may be the same as register 52 of FIG. 3. The computed address again consists of a process identifier 128, a segment identifier 130, a page identifier 132 and a displacement identifier 134. However, utilizing the look-aside buffer instead of the virtual address translation process described in FIG. 6, an associative search is made of a set of registers 136 by the process identifier 128, the segment identifier 130 and the page identifier 132. Each one of the plurality of registers 136 of the look-aside buffer contain a process identifier 138, a segment identifier 140, a page identifier 142 and a frame identifier 144. Utilizing an associative search using the three identifiers, if the process identifier 128 matches exactly the process identifier 138 and the segment identifier 130 matches exactly the segment identifier 140 and the page identifier 132 matches exactly the page identifier 142, then an associative match has been made within the set of registers 136 comprising the look-aside buffer. In this instance the frame identifier 144 is obtained directly from the selected one of the set of registers 136 and the frame identifier 144 is concatenated with the displacement identifier 134 from register 126 and the two are inserted into the memory address register 146 and this concatenated information is utilized to directly address resident memory as an absolute address. The set of registers 136 comprising the look-aside buffer contain frame identifiers for those process, segment and pages which have most recently been used or possibly are most likely to be used. Note that if the associative search in the set of registers 136 comprising the look-aside buffer is successful, the pointer selection via the process identifier in FIG. 6 is not needed, nor is it necessary to address the page tables 120 of FIG. 6 to obtain the frame identifier since the frame identifier is available directly from the set of registers 136 comprising the look-aside buffer.

Figure 8:
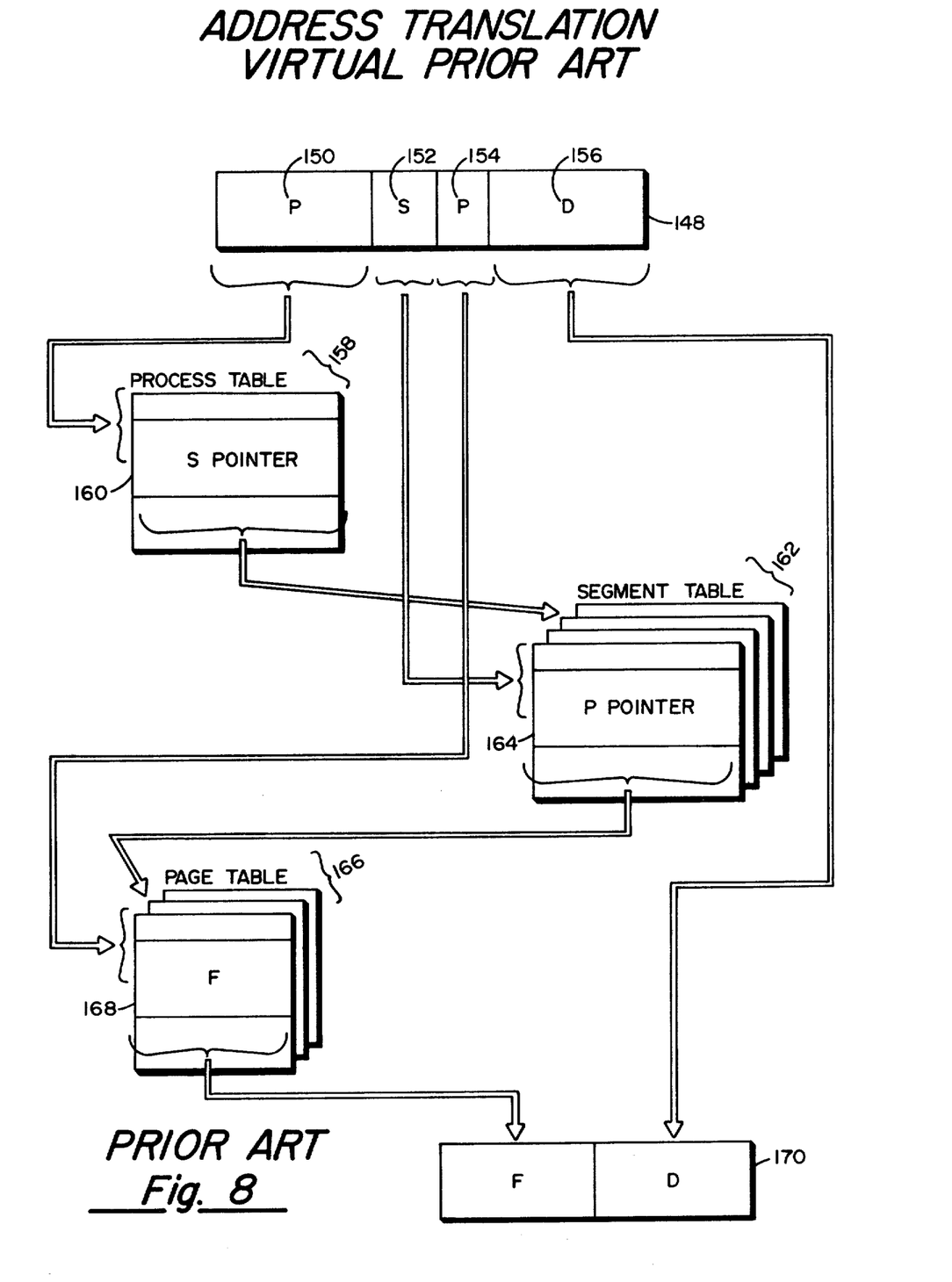
FIG. 8 is a schematic representation of a prior art virtual address translation mechanism.

The virtual address translation option described in FIG. 6 differs from virtual address translation apparatus in the prior art. An example of a prior art virtual address translation mechanism utilizing the same computed address from the address computation mechanism is illustrated in FIG. 8. Here the computed address is contained in register 148 and consists of a process identifier 150, a segment identifier 152, a page identifier 154 and a displacement identifier 156. In such a prior art virtual address translation mechanism, the process identifier 150 contained in register 148 first is utilized to address a plurality of process registers 158 known as a process table. Contained in a selected one of the plurality of registers 158 is a segment pointer 160. The segment pointer 160 then is utilized to select one of a plurality of segment tables 162. Each one of the segment tables 162 contains a plurality of locations. The segment identifier 152 contained in register 148 is then utilized as an index into a selected one of the segment tables 162 and is used to obtain a page pointer 164 contained therein. The page pointer 164 is then utilized to select one of a plurality of page tables 166, each containing a plurality of locations. The page identifier 154 of register 148 is then utilized as an index into the selected one of the page tables 166 to obtain a frame identifier 168. The frame identifier 168 is then concatenated with the displacement identifier 156 of register 148 and both are inserted into memory address register 170 to be utilized as an absolute address into resident memory.

The virtual address translation option of the present invention described in FIG. 6 provides a substantial advantage and benefit over the prior art virtual address translation mechanism described in FIG. 8. In the virtual address translation mechanism described in FIG. 6, only two table references are needed to obtain the frame identifier needed to address resident memory in an absolute manner. One reference is needed to obtain the pointer and one reference is needed to obtain the frame identifier. In the prior art virtual address translation mechanism of FIG. 8 three table references are required. One is needed to obtain the segment pointer, one is needed to obtain the page pointer and finally one is needed to obtain the frame identifier. Further, since it is common to provide the process table 158, the segment table 162 and the page table 166 of FIG. 8 in resident memory instead of in separate hardware registers, a total of three memory references are required before the absolute memory address is determined and a fourth memory reference is then required to obtain the data word itself. In the improved virtual address translation mechanism of FIG. 6, however, only two memory references are required to obtain the frame identifier and a third memory reference is made to acquire the data word. Further, the process selection, via an associative selection means, is most likely to be provided in a separate hardware register rather than in resident memory and, that being the case, the virtual address translation mechanism of FIG. 6 only requires one memory reference to obtain the frame identifier and a second memory reference to obtain the requested data word.

TABLE I

VIRTUAL ADDRESS TRANSLATION STEPS

1. Take page table pointer from state registers.
2. Reference memory into page table using page table pointer as reference and segment page double as offset.
3. Obtain frame number from page table reference.
4. Concatenate frame number with deflectioon to obtain real memory address.
5. Reference memory using real memory address.

$$\begin{pmatrix} \text{TWO MEMORY REFERENCES} \\ \text{STEP 2 AND STEP 5} \end{pmatrix}$$

The advantage in obtaining improved performance characteristics from utilizing the virtual address translation mechanism described in FIG. 6 is illustrated more clearly by reference to the following Table I which describes the steps to be performed to obtain a memory reference utilizing the virtual address translation structure. Referring to Table I, the first step is to obtain the page table pointer from the state register via the associative selection with the process identifier from the computed address register. This step corresponds to utilizing the process identifier 104 to associatively select one of a plurality of state registers 112 to obtain the page table pointer 118, in FIG. 6. The second step is to reference memory into the page table using the page table pointer as a reference and the segment identifier, page identifier double as an offset. With respect to FIG. 6, this involves the taking of the pointer 118 and using it to select one of a plurality of page tables 120 and then utilizing the segment identifier 106 and page identifier 108 as an index into a selected one of the page tables 120. Step 3 in the Table I involves securing the frame number from the page table reference. This has reference in FIG. 6 to obtaining the frame identifier 122 from the selected location in a selected one of the page tables 120. Step 4 involves the concatenation of the frame number with the deflection identifier to obtain the real memory address. This has reference in FIG. 6 to concatenating the frame identifier 122 obtained from a selected location in one of the selected page tables 120 and then concatenating that value with the deflection identifier 110 obtained from the computed address register 102. Step 5 in the Table I involves referencing of the resident memory using the concatenated value as a real absolute memory address. This has reference in FIG. 6 to referencing memory with the contents of register 124. It is to be noted that in the virtual address translation steps only two memory references are required. The first memory reference is required in Step 2 when the page table is referenced to obtain the frame identifier, and the second memory reference is required in step 5 to use the translated address to obtain the object data word.

A comparison can be made to prior art visual address translation mechanisms by reference to the steps required to obtain the object data word utilizing prior art virtual address translation mechanisms as is illustrated clearly in Table II below. Step 1 involves a reference to memory into the process table using the process number from the computed address register for an offset. This has reference to the prior art virtual address translation mechanism in FIG. 8 when the process identifier 150 is taken from the computed address register 148 as an index into the set of registers 158. Step 2, set forth in Table II involves obtaining the segment pointer from the process table reference. This has reference in FIG. 8 to obtaining the segment pointer 160 from a selected one of the process table registers 158. Step 3 involves a second reference memory into the segment table using the segment pointer as a reference and the segment number as an offset. This has reference in FIG. 8 to utilizing the segment pointer 160 to select one of a plurality of segment tables 162, each containing a plurality of locations and utilizing the segment identifier 152 of the computed address register 148 to select one of those locations. Step 4 when executed obtains the page pointer from the segment table reference. This has correspondence in FIG. 8 to obtaining the page pointer 164 from a selected location in a selected one of the segment tables 162. Step 5 in Table II involves a third reference to memory into the page table using the page table pointer as a reference and the page number as an offset. This corresponds to utilizing the page pointer 164 to select one of a plurality of page tables 166 each containing a plurality of locations and using the page identifier 154 and the computed address register 148 to select one of the plurality of locations in a selected one of the page tables 166 as shown in FIG. 8. Step 6 involves obtaining the frame number from the page table reference.

TABLE II

VIRTUAL ADDRESS TRANSLATION STEPS - PRIOR ART

1. Reference memory into process table using process number for offset and a predetermined reference.
2. Obtain segment pointer from process table reference.
3. Reference memory into segment table using segment pointer as reference and segment number as offset.
4. Obtain page pointer from segment table reference.
5. Reference memory into page table using page pointer as reference and page number as offset.
6. Obtain frame number from page table reference.
7. Concatenate frame number with deflection to obtain real memory address.
8. Reference memory using real memory address.

( FOUR MEMORY REFERENCES
STEP 1, STEP 3, STEP 5 AND STEP 8 )

This corresponds to obtaining the frame identifier 168 from the selected location in a selected one of the page tables 166 as explained in connection with FIG. 8. Step 7 involves concatenating the frame number with the deflection identifier to obtain a real memory address. In FIG. 8, this corresponds to concatenating the frame identifier 168 obtained from a selected location one of a selected one of the page tables 166 which the deflection identifier 166 obtained from the computed address register 148 and inserting the concatenated value into the memory address register 170. Step 8 in Table II involves a fourth reference to memory using the determined value as an absolute memory address. This corresponds in FIG. 8 to using the contents of the memory address register 170 as an absolute address in memory. Note that the steps required to form the virtual address in the prior art virtual address translation mechanism requires four memory references. One memory reference was required in step 1 to obtain the segment pointer from the process table. A second memory reference was required in step 3 to obtain the page pointer from the segment table and a third reference was required in step 5 to obtain the frame number from the page table. A fourth memory reference was required in step 8 to obtain the object data word from memory.

It can be seen that the virtual address translation mechanism of the present invention provides a substantial benefit over the prior art virtual address translation mechanisms in that only two memory references are required instead of four. This saving in memory references, and therefore time, is due primarily to the selection of the state registers in hardware registers external to memory and to the selection of the frame number from the page tables utilizing a segment, page double as an index.

The preferred embodiment of the present invention has been shown and described in block diagram form illustrating the use of the hardware registers and the data flow between the registers and memory. With this description, it would be within the skill of one having ordinary skill in the art to construct the actual flip-flops, load control signals and timing circuitry necessary to implement the block diagram registers illustrated herein.

Thus, it can be seen that there has been shown and described a novel apparatus for performing an optional virtual memory system. It is to be understood, however, that various changes, modifications and substitutions in the form of the details of the described apparatus can be made by those skilled in the art without departing from the scope of the invention as defined by the following claims.

What is claimed is:

1. In a digital computer of the type having a memory for storing words of data at addressable locations therein, an address generation apparatus for generating a single memory address from a software specified address consisting of a register identifier and offset identifier and from predetermined state information, comprising:
- a first register for holding said software specified address including said register identifier and said offset identifier;
- a first set of registers selectable from the portion of said first register containing said register identifier, each of said first set of registers containing said predetermined state information consisting of process, segment and pointer identifiers;
- a first selector means coupled to said first register and to said first set of registers to receive said register identifier for selecting one of said first set of registers;
- a second register, a portion of which is coupled to the portion of said first register containing said offset identifier and another portion of which is coupled to receive the portion of the selected one of said first set of registers containing said process and segment identifiers, said second register for holding at least four fields adapted to specify process and segment identifiers obtained directly from said process and segment identifiers of the selected one of said first set of registers and to further specify page and displacement identifiers obtained by partitioning said offset identifier from said first register;
- storage means including a plurality of memory locations, each holding a frame identifier, said storage means being directly addressable by the concatenation of said pointer identifier from the selected one of said first set of registers and said segment and page identifiers from said second register; and
- a third register, a portion of which is coupled to said storage means for receiving a selected frame identifier from said storage means and another portion of which is coupled to the portion of said second register containing said displacement identifier, said third register thereby said single memory address obtained by concatenating said frame identifier with said displacement identifier.

2. An address generation apparatus as in claim 1 which further comprises:
- a second set of registers associatively selectable from the portion of said second register containing said process, segment and page identifiers, each of said second set of registers for holding process, segment and page identifiers and a frame address;
- a second selector means coupled to said second register and to said second set of registers to receive said process, segment and page identifiers for associatively selecting one said second set of registers; and
- means coupling a selected one of said second set of registers to said third register instead of one of said plurality of memory locations in said storage means whenever an associative match between said process, segment and page identifiers of said second register and a selected one of said second set of registers occurs whereby said third register obtains said frame address from said portion of the selected one of said second set of registers containing said frame address.

3. An address generation apparatus as in claim 1 which further comprises:
- a second set of registers associatively selectable from the portion of said second register containing said process, segment and page identifiers, each of said second set of registers for holding process, segment and page identifiers and an address code;
- a second selector means coupled to said second register and to said second set of registers to receive said process, segment and page identifiers for associatively selecting one said second set of registers; and
- a third set of registers each of which is selectable from the portion of the selected one of said second set of registers containing said address code, each of said third set of registers for holding a frame address;
- a third selector means coupled to said second set of registers and to said third set of registers to receive said address code for selecting one said third set of registers; and
- means coupling the selected one of said third set of registers to said third register instead of one of said plurality of memory locations in said storage means whenever an associative match between said process, segment and page identifiers of said second register and a selected one of said second set of registers occurs whereby said third register obtains said frame address from the portion of the selected one of said third set of registers containing said frame address.

4. In a digital computer of the type having a memory for storing words at addressable locations therein, an address generation apparatus for generating a single memory address from a software specified address consisting of register identifier and offset identifier and from predetermined state information, comprising:
- a first register for holding said software specified address including said register identifier and said offset identifier;
- a first set of registers selectable from the portion of said first register containing said register identifier, each of said first set of registers containing a portion of said predetermined state information consisting of process, segment and index identifiers;
- a first selector means coupled to said first register and to said first set of registers to receive said register identifier for selecting one of said first set of registers;
- a second set of registers each for holding a further portion of said state information consisting of process, segment and pointer identifiers;
- state selection means coupled to the portion of a selected one of said first set of registers containing said process identifier, said state selection means also coupled to said second set of registers for selecting one of said second set of registers utilizing said process identifier of said state information;
- a second register, a portion of which is coupled to the portion of said first register containing said offset identifier and another portion of which is coupled to receive the portion of the selected one of said first set of registers containing said process and segment identifiers, said second register for holding at least four fields adapted to specify process and segment identifiers obtained directly from said process and segment identifiers of the selected one of said first set of registers and to further specify page and displacement identifiers obtained by partitioning said offset identifier from said first register;

storage means including a plurality of memory locations, each holding a frame identifier, said storage means being directly addressable by the concatenation of said pointer identifier from the selected one of said second set of registers and said segment and page identifiers from said second register; and a third register a portion of which is coupled to said storage means for receiving a selected frame identifier from said storage means and another portion of which is coupled to the portion of said second register containing said displacement identifier, said third register thereby said single memory address obtained by concatenating said frame identifier with said displacement identifier.

5. An address generation apparatus as in claim 4 which further comprises:

a third set of registers associatively selectable from the portion of said second register containing said process, segment and page identifiers, each of said third set of registers for holding process, segment and page identifiers and a frame address;

a second selector means coupled to said second register and to said third set of registers to receive said process, segment and page identifiers for associatively selecting one of said third set of registers; and means coupling a selected one of said third set of registers to said third register instead of one of said plurality of memory locations in said storage means whenever an associative match between said process, segment and page identifiers of said second register and a selected one of said third set of registers occurs whereby said third register obtains said frame address from said portion of the selected one of said third set of registers containing said frame address.

6. An address generation apparatus as in claim 4 which further comprises:

a third set of registers associatively selectable from the portion of said second register containing said process, segment and page identifiers, each of said third set of registers for holding process, segment and page identifiers and an address code;

a second selector means coupled to said second register and to said third set of registers to receive said process, segment and page identifiers for associatively selecting one said third set of registers; and a fourth set of registers each of which is selectable from the portion of the selected one of said third set of registers containing said address code, each of said fourth set of registers for holding a frame address;

a third selector means coupled to said third set of registers and to said fourth set of registers to receive said address code for selecting one said fourth set of registers; and means coupling the selected one of said fourth set of registers to said third register instead of one of said plurality of memory locations in said storage means whenever an associative match between said process, segment and page identifiers of said second register and a selected one of said third set of registers occurs whereby said third register obtains said frame address from the portion of the selected one of said fourth set of registers containing said frame address.

7. In a digital computer of the type having a memory for storing words at addressable locations therein, an address generation apparatus for generating a single memory address from a software specified address consisting of mode identifier, register identifier and offset identifier and from predetermined state information, comprising:

a first register for holding said software specified address including said register identifier and said offset identifier;

a first set of registers selectable from the portion of said first register containing said register identifier, each of said first set of registers containing a portion of said predetermined state information consisting of process, segment and index identifiers;

a first selector means coupled to said first register and to said first set of registers to receive said register identifier for selecting one said first set of registers;

a second set of registers, each for holding a further portion of said state information consisting of process, segment and pointer identifiers;

state selection means coupled to the portion of a selected one of said first set of registers containing said process identifier, said state selection means also coupled to said second set of registers for selecting one of said second set of registers based on said state information;

mode control means coupled to the portion of said register containing said offset identifier and coupled to the portion of said first set of registers containing said index identifier and controlled by the portion of said first register containing said mode identifier, said mode control means for performing arithmetic operations including addition, subtraction, incrementation and decrementation upon said offset and index identifiers as specified by said mode identifiers and producing an output which is the result of said arithmetic operation;

a second register, a portion of which is coupled to said mode control means and another portion of which is coupled to receive the portion of the selected one of said first set of registers containing said process and segment identifiers, said second register for holding at least four fields adpated to specify process and segment identifiers obtained directly from said process and segment identifiers of the selected one of said first set of registers and to further specify page and displacement identifiers obtained by partitioning said output of said mode control means;

storage means including a plurality of memory locations, each holding a frame identifier, said storage means being directly addressable by the concatenation of said pointer identifier from the selected one of said second set of registers and said segment and page identifiers from said second register; and a third register a portion of which is coupled to said storage means for receiving a selected frame identifier and another portion of which is coupled to the portion of said second register containing said displacement identifier, said third register thereby said single memory address obtained by concatenating said frame address with said displacement identifier.

8. An address generation apparatus as in claim 7 which further comprises:
- a third set of registers associatively selectable from the portion of said second register containing said process, segment and page identifiers, each of said third set of registers for holding process, segment and page identifiers and a frame address;
- a second selector means coupled to said second register and to said third set of registers to receive said process, segment and page identifiers for associatively selecting one said third set of registers; and
- means coupling a selected one of said third set of registers to said third register instead of one of said plurality of memory locations in said storage means whenever an associative match between said process, segment and page identifiers of said second register and a selected one of said third set of registers occurs whereby said third register obtains said frame address from said portion of the selected one of said third set of registers containing said frame address.

9. An address generation apparatus as in claim 7 which further comprises:
- a third set of registers associatively selectable from the portion of said second register containing said process, segment and page identifiers, each of said third set of registers for holding process, segment and page identifiers and an address code;
- a second selector means coupled to said second register and to said third set of registers to receive said process, segment and page identifiers for associatively selecting one said third set of registers; and
- a fourth set of registers each of which is selectable from the portion of the selected one of said third set of registers containing said address code, each of said fourth set of registers for holding a frame address;
- a third selector means coupled to said third set of registers and to said fourth set of registers to receive said address code for selecting one said fourth set of registers; and
- means coupling the selected one of said fourth set of registers to said third register instead of one of said plurality of memory locations in said storage means whenever an associative match between said process, segment and page identifiers of said second register whereby a selected one of said third set of registers occurs and said third register obtains said frame address from the portion of the selected one of said fourth set of registers containing said frame address.

10. In a digital computer of the type having a memory for storing words at addressable locations therein, an address generation apparatus for generating a single memory address from a software specified address consisting of mode identifier and offset identifier and from predetermined state information, comprising:
- a first register for holding said software specified address including said mode identifier, said register identifer and offset identifier;
- a first set of registers selectable from the portion of said first register containing said register identifier, each of said first set of registers containing said predetermined state information consisting of process, segment and index identifiers;
- a first selector means coupled to said first register and to said first set of registers to receive said register identifier for selecting one of said first set of registers;
- mode control means coupled to the portion of said first register containing said offset identifier and coupled to the portion of said first set of registers containing said index identifier and controlled by the portion of said first register containing said mode identifier, said mode control means for performing airthmetic operations including addition, subtraction, incrementation and decrementation upon said offset and index identifiers as specified by said mode identifier in order to perform software specified address modification and producing an output which is the result of said arithmetic operation and which consists of page and displacement identifiers partitioned from said result;
- a second register, a portion of which is coupled to said mode control means and another portion of which is coupled to receive the portion of the selected one of said first set of registers containing said process and segment identifiers, said second registers for holding at least four fields adapted to specify process and segment identifiers obtained directly from said process and segment identifiers of the selected one of said first set of registers and to further specify page and displacement identifiers obtained from said output of said mode control means;
- a second set of registers associatively selectable from the portion of said second register containing said process, segment and page identifiers, each of said second set of registers for holding process, segment and page identifiers and a frame address;
- a second selector means coupled to said second register and to said second set of registers to receive said process, segment and page identifiers for associatively selecting one of said second set of registers; and
- a third register a portion of which is coupled to the portion of the selected one of said second set of registers containing said frame address and another portion of which is coupled to the portion of said second register containing said displacement identifier, said third register thereby said single memory address obtained by concatenating said frame address with said displacement identifier.

11. In a digital computer of the type having a memory for storing words at addressable locations therein, an address generation apparatus for generating a single memory address from a software specified address consisting of mode identifier, register identifier and offset identifier and from predetermined state information, comprising:
- a first register for holding said software specified address including said mode identifier, said register identifier and said offset identifier;
- a first set of registers selectable from the portion of said first register containing said register identifier, each of said first set of registers containing said predetermined state information consisting of process, segment and index identifiers;
- a first selector means coupled to said first register and to said first set of registers to receive said register identifier for selecting one of said first set of registers;
- mode control means coupled to the portion of said first register containing said offset identifier, and coupled to the portion of said first set of registers containing said index identifier and controlled by the portion of said first register containing said mode identifier, said mode control means for performing arithmetic operations including addition, subtraction, incrementation and decrementation upon said offset and index identifiers as specified by said mode identifier in order to perform software specified address modification and producing an output which is the result of said arithmetic operation and which consists of page and displacement identifiers partitioned from said result;

means for coupling the output of said mode control means to the input of the portion of the selected one of said first set of registers containing said index identifier, the output of said mode control means being partitioned into page and displacement identifiers, whereby said index identifier is replaced by said page and displacement identifiers;

a second set of registers associatively selectable from the portion of the selected one of said first set of registers containing said process, segment and page identifiers, each of said second set of registers for holding process, segment and page identifiers and a frame address;

a second selector means coupled to said first set of registers and to said second set of registers to receive said process, segment and page identifiers for selecting one of said second set of registers; and a third register a portion of which is coupled to the portion of the selected one of said second set of registers containing said frame address and another portion of which is coupled to the portion of the selected one of said first set of registers containing said displacement identifier, said third register thereby said single memory address obtained by concatenating said frame address with said displacement identifier.

12. In a digital computer of the type having a memory for storing words at addressable locations therein, a method for generating a single memory address from a software specified address consisting of register and offset identifiers and from predetermined state information, comprising the steps of:

referencing a selected one of a first set of registers based upon said register identifier to obtain said predetermined state information consisting of process, segment and index identifiers;

computing page and displacement identifiers by combining said offset identifier and said index identifier and partitioning the result;

referencing a second set of registers based upon said process identifier contained in said one of said first set of registers to obtain a pointer identifier;

referencing one of a plurality of memory locations based upon said pointer identifier and upon said segment and page identifiers to obtain a frame address; and combining said frame address with said displacement identifier to obtain said single memory address.

13. A method as in claim 12 wherein said combining of said frame address and said displacement identifier comprises concatenation.

14. A method as in claim 12 further comprising the steps of:

referencing a third set of registers based upon an associative search utilizing said process, segment and page identifiers to obtain a frame address; and aborting the referencing of one of a plurality of memory locations if said associative search of said third set of registers produces a match.

* * * * *

UNITED STATES PATENT AND TRADEMARK OFFICE
CERTIFICATE OF CORRECTION

PATENT NO. : 4,128,875
DATED : December 5, 1978
INVENTOR(S) : Kenneth J. Thurber, et al It is certified that error appears in the above-identified patent and that said Letters Patent are hereby corrected as shown below:

<u>IN THE PRINTED PATENT</u>

Column 11, Line 48, "thereby said" should be -- thereby holding said --.

Column 13, Line 17; Column 14, Line 65; Column 16, Line 44; Column 17, Line 36; "thereby said" should be -- thereby holding said --.

Column 14, Line 31, "on" should be -- upon --.

Column 14, Line 32, "said register" should be -- first register --.

Column 14, Line 48, "adpated" should be -- adapted --.

Column 15, Line 57, "mode identifier and" should be -- mode identifier, register identifier and --.

Column 16, Line 9, "airthmetic" should be -- arithmetic --.

Column 16, Line 22, "registers" should be -- register --.

Signed and Sealed this

Third Day of April 1979

[SEAL]

Attest:

RUTH C. MASON
*Attesting Officer*

DONALD W. BANNER
*Commissioner of Patents and Trademarks*